United States Patent [19]

Itoh

[11] Patent Number: 5,583,838
[45] Date of Patent: Dec. 10, 1996

[54] RECORDING APPARATUS HAVING DATA RECORDING RATE PHASE-SYNCHRONIZED TO RECORDING TIME DATA RECORDED ON A RECORDING MEDIUM

[75] Inventor: Takashi Itoh, Nagaokakyo, Japan

[73] Assignee: Mitsubishi Denki Kabushiki Kaisha, Tokyo, Japan

[21] Appl. No.: 424,571

[22] Filed: Apr. 17, 1995

Related U.S. Application Data

[63] Continuation of Ser. No. 27,763, Mar. 8, 1993, abandoned.

[30] Foreign Application Priority Data

Mar. 12, 1992 [JP] Japan .................................. 4-053226
Aug. 3, 1992 [JP] Japan .................................. 4-227977

[51] Int. Cl.⁶ .................................................. G11B 5/09
[52] U.S. Cl. .................................. 369/48; 369/54
[58] Field of Search .................... 369/60, 50, 48, 369/47, 49, 59, 54, 58, 32; 360/73.03

[56] References Cited

U.S. PATENT DOCUMENTS 4,872,073  10/1989  Fincher et al. ........................... 360/51
4,984,227   1/1991  Yoshimaru ............................... 369/50
5,093,820   3/1992  Maeda et al. ............................ 369/50
5,212,678   5/1993  Roth et al. .............................. 369/60
5,249,170   9/1993  Yoshimaru et al. ...................... 369/48

FOREIGN PATENT DOCUMENTS 63-56610  11/1988  Japan .
310171     2/1991  Japan .
383265     4/1991  Japan .

Primary Examiner—Georgia Y. Epps
Assistant Examiner—P. W. Huber

[57] ABSTRACT

In a recording apparatus to record data by applying a light beam of high and low intensities onto a recording medium (disk), the intensities of the reflected light beams from the disk for the two kinds of light beams are detected to control the light intensity for recording in synchronization with the timing of the bits formed on the disk. In a recording apparatus which records data supplied from a data source via a buffer memory, data is recorded on the disk in a specified recording density by controlling the recording operation in accordance to the occupation ratio in the buffer memory.

13 Claims, 8 Drawing Sheets

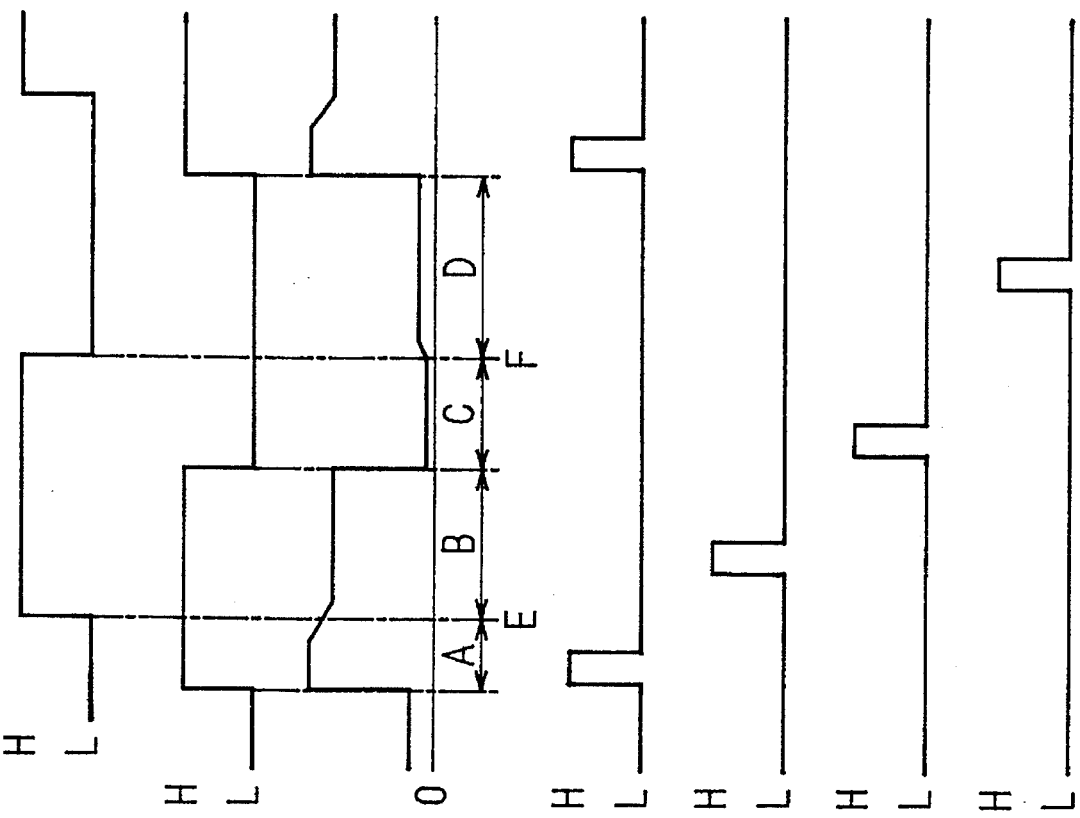

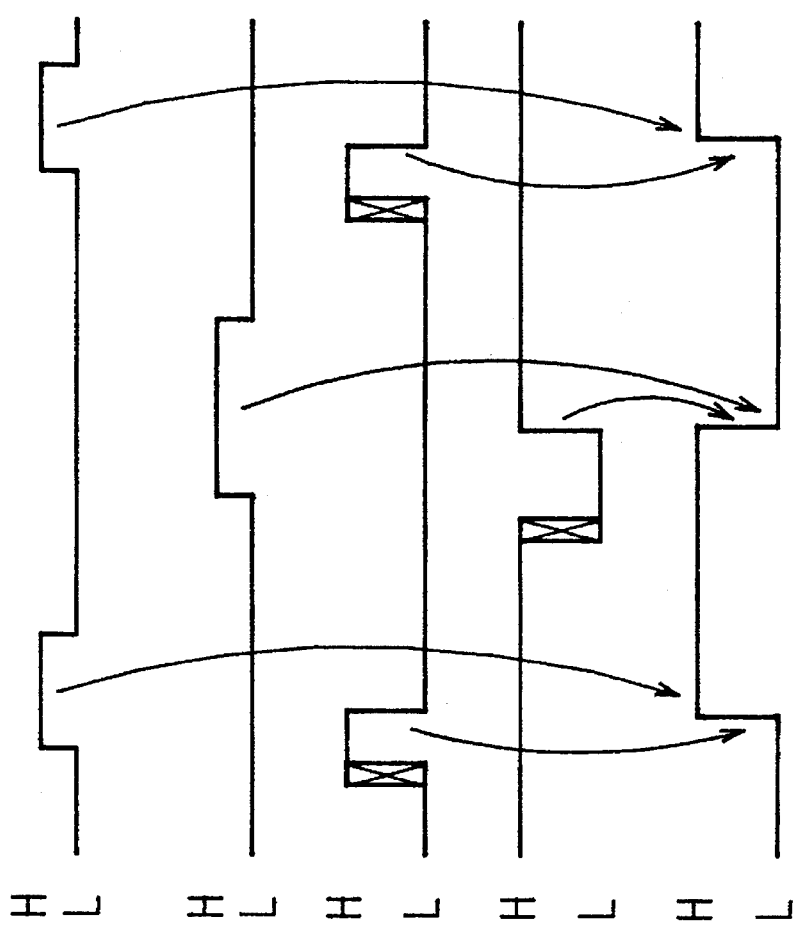
Fig. 3(h) WPS
Fig. 3(i) WPW
Fig. 3(j) OUTPUT OF COMPARATOR 27
Fig. 3(k) OUTPUT OF COMPARATOR 26
Fig. 3(l) OUTPUT OF FLIP-FLOP 28

Fig. 4

RECORDING APPARATUS HAVING DATA RECORDING RATE PHASE-SYNCHRONIZED TO RECORDING TIME DATA RECORDED ON A RECORDING MEDIUM

This application is a continuation of application Ser. No. 08/027,763 filed on Mar. 8, 1993, now abandoned.

BACKGROUND OF THE INVENTION

1. Field of the Invention

The present invention relates to a recording apparatus and a recording medium used in the recording apparatus.

2. Description of Related Art

Although compact disks (CD) are used as the media to record various data including audio signals, the CD is used only in reproduction. Recently a CD-R disk has been proposed as a recordable medium which can be handled similarly to a CD during reproduction. Data can be recorded on the CD-R disk by a light beam with high and low intensities to the CD-R disk, which is a so-called optical modulation recording. The quality of reproducing the recorded data heavily depends on the light beam of high intensity which causes a change in the recording medium. Intensity of this light beam is optimized by the method described below.

FIG. 1 is a block circuit diagram illustrating a recording apparatus of the prior art. In FIG. 1, numeral 1 denotes a CD-R disk (called "disk" hereafter) used as the recording medium, whereon guide grooves which serve as the targets of applying the converged light beam wobble at nearly constant wobble interval, the time data including the constantly updated minute, second and frame numbers (frame numbers are integers 0 through 74 which divide one second into 75 equal parts) and the standard level (Optimum Power Control) data of the recording light intensity are recorded beforehand as ATIP signals in the form of changes in the intervals.

Numeral 2 denotes a pickup which records and reproduces the data by applying a converged light beam onto the disk 1. Numeral 3 denotes a light detector which converts the light reflected by the disk 1 into an electric signal (current). Numeral 4 denotes an I/V converter which converts the current from the light detector 3 into voltage. Numeral 5 denotes a comparator which carries out binary discrimination of the signal from the I/V converter 4. Numeral 6 denotes a discriminator which determines the duty cycle of the output signal from the comparator 5. Numeral 7 denotes a power controller which controls the intensity of the high-intensity light emitted by the pickup 2 during recording. Numeral 8 denotes a micro-processor. Numeral 9 denotes a decoder which separates the time data from the wobbling of the guide grooves. Numeral 10 denotes a data source which supplies digital data to be recorded. Numeral 11 denotes a memory for temporary storage of the digital signal from the data source 10. Numeral 12 denotes an error controller which generates error control code called CIRC and adds the code to the data to be recorded, which is stored in the memory 11. Numeral 13 denotes a modulator which reads out the data to be recorded from the memory 11 and converts it into an output signal in the signal format called EFM suitable for recording and reproduction, thereby to supply the record signal to the pickup 2. Numeral 14 denotes a motor which drives the disk 1 to rotate. Numeral 15 denotes a velocity controller which controls the rotation speed of the motor 14 based on the ATIP signal so that the disk 1 turns at a linear velocity that is approximately constant. Numeral 16 denotes a servo circuit which controls the pickup 2 so that the light beam tracks the guide grooves on the disk 1.

The operation will now be described below.

As the first stage of recording, the recording light intensity is determined in the following steps.

(1) Under direction of the microprocessor 8, the pickup 2 is moved into the inner recordable area of the disk 1 to reproduce the disk 1 and separate OPC data from the ATIP signal in the decoder 3, with the OPC data being stored by the micro-processor 8.

(2) The OPC data being stored by the microprocessor 8 is used as the first record signal intensity to set a recording light intensity by controlling the power controller 7.

(3) The first record signal intensity is used to record on the disk 1 for a short period of time.

(4) The signal recorded for a short period of time in the above step is reproduced, to check to see if the recording intensity of the signal is appropriate or not by means of the non-symmetrical signal of the reproduced signal from the discriminator 6.

(5) In case the recording light intensity of the signal is appropriate, the operation proceeds to the second stage (actual recording operation) and, when it is required to alter the recording light intensity, the recording light intensity is changed and the signal is recorded again for a short period and then reproduced.

When the recording light intensity is determined in the first stage, the pickup 2 is moved to the specified recording start position where recording of data onto the disk 1 is started with the determined recording light intensity.

As described above, once the recording light intensity has been determined and the recording operation has started, the light intensity on the CD-R disk is maintained constant until the end of recording. As a consequence, it is difficult to maintain satisfactory quality of reproduced signal if the response (sensitivity) of the recording medium to light intensity is not uniform, or if the effective sensitivity of the disk i varies through variation of wavelength of emitting light from pickup 2 with time.

A recording apparatus is rarely found in the prior art that can record satisfactory signals on the recording media at a different recording speed from that normally specified. Examples related thereto will be described below.

The first example is an analog audio copying (dubbing) apparatus from a compact cassette to another cassette. This apparatus houses a player and a recorder in a single housing to enable an easy dubbing operation. This kind of apparatus is capable of dubbing at a higher speed than the specified speed for the convenience of the user. However, it can handle only analog signals and is not capable of handling digital signals.

The second example is the recording apparatus for digital signals on a digital audio tape (DAT) deck which handles digital audio signals or computer data. The signal recording and reproduction speed of DAT is usually fixed, and recording is carried out only at a specified speed. In this example, the DAT is used in its normal manner. That is, an analog audio signal is converted into a digital signal. And, the signal is recorded on the tape at substantially constant speed. On the other hand, it is desirable that the DAT be able to record such signals as computer data or digital still image data in a shorter period, i.e., at a speed faster than the speed specified in the audio recording. But, as mentioned above, the DAT has a drawback of inability to record in a shorter period.

The third example is the optical disk, represented by the CD, wherein analog or digital data is recorded in the form of pits or the like at a constant linear velocity. In this case, the recording track number of the disk is controlled in accordance with the position of the recording head relative to the disk, while the relative moving speed between the head and the data recording track of the disk is regulated to be constant (1.2 to 1.4 m/sec.). In this example, the rotation speed of the disk with large inertia should be controlled so as to be the proper speed according to the recording position on the disk. When the recording head transfers from a recording position to the start position of recording, a long time is needed to attain the proper rotation speed of the disk due to the disk's large inertia. Thus there is the drawback of requiring a longer wait time before starting the recording operation.

SUMMARY OF THE INVENTION

One object of the invention is to provide a recording apparatus capable of obtaining a high quality recording signal in recording on a recording medium such as a CD-R disk.

Another object of the invention is to provide a recording apparatus capable of recording at a high speed and a recording medium suitable thereto.

A further object of the invention is to provide a recording apparatus capable of recording at a constant linear recording density independent of the recording speed and a recording medium suitable thereto.

A first recording apparatus according to the invention is provided with light receiving a means for receiving reflected light beam from a recording using a medium for recording light beam of high and low intensities, holding means for holding the signal values from the light receiving means According to the two kinds of light intensities and the corresponding states on the recording medium, detecting means for detecting the transition timing of the changing of said states on the recording medium by means of the signals from the holding means and the light receiving means, and control means for controlling the intensities of the recording light beams in order to obtain a specified duty cycle according to the signal from the detecting means.

A second recording apparatus according to the invention is provided with light receiving means, holding means and detecting means which are equivalent to those of the first recording apparatus, and control means for detecting the imbalance in the occurrence probability between the two states on the recording medium by means of the transition timing, and controlling the intensities of the recording light beam to eliminate the imbalance.

A third recording apparatus according to the invention is provided with light receiving means, holding means and detecting means which are equivalent to those of the first recording apparatus, a data source to control the timing of the changes of recording light beam and control means for controlling the intensities of the recording light beam to obtain a specified delay in the transition timing with respect to the signal supplied from the data source.

The first through third recording apparatuses are capable of maintaining the quality of record signals during reproduction even when the sensitivity of the recording medium to the light intensity varies.

A fourth recording apparatus according to the invention is provided with a head to record data in the form of data tracks on a recording medium, driving means for driving the recording medium to rotate at a specified rotation speed, and processing means for processing the data to be recorded so that the data is recorded on the data tracks in a specified recording density. Thus it is capable of recording data while keeping the linear recording density constant even with an arbitrary recording speed.

A fifth recording apparatus according to the invention is provided with a head to record data on a recording medium sequentially through its relative movement to the recording medium, driving means for imparting the relative movement to the recording medium or the head, detecting means for detecting the relative movement, and control means for controlling the data recording speed in accordance to the relative speed detected by the detecting means. Thus it is capable of recording data while keeping the linear recording density constant without need to generate a variation in the relative movement.

A sixth recording apparatus according to the invention is a recording apparatus to record data supplied from a data source on a recording medium through a record head's relative movement to the recording medium, a buffer memory installed between the data source and the head to provide buffering between the data transmission speed of the data source and the recording speed of the head onto the recording medium, and control means for controlling the relative movement in accordance to the occupation ratio in the buffer memory. Thus it is capable of recording data while keeping the linear recording density constant even with an arbitrary recording speed.

A seventh recording apparatus according to the invention is provided with a head to record data on a recording medium by imparting such a recording intensity to the recording medium as causes magnetic or optical changes in the recording medium accompanied by the head's movement relative to the recording medium, driving means for imparting the relative movement to the recording medium or the head, detecting means for detecting the relative movement, and control means for controlling the driving force in accordance to the speed of the relative movement. Thus it is capable of recording data while keeping the linear recording density constant even when the speed of the relative movement between the recording medium and the head changes.

In the recording medium according to the invention, position data which is updated in the unit of specified track length is recorded in at least a spiral recording track, and invalid intervals wherein the recorded data is invalid are set in synchronization with the position data. As a consequence, because an invalid interval is set for each track length, it is made easy to interrupt recording while utilizing the recording medium efficiently with a constant linear recording density, and it is made possible to record data with a constant linear recording density even when the recording speed is arbitrarily set.

The above and further objects and features of the invention will more fully be apparent from the following detailed description with accompanying drawings.

BRIEF DESCRIPTION OF THE DRAWINGS

FIG. 3(a) is a diagram showing a desirable playback signal;

FIG. 3(b) is a diagram showing an EFM signal;

FIG. 3(c) is a diagram showing the intensity of reflected light;

FIG. 3(d) is a diagram showing a sampling pulse;

FIG. 3(e) is a diagram showing a sampling pulse;

FIG. 3(f) is a diagram showing a sampling pulse;

FIG. 3(g) is a diagram showing a sampling pulse;

FIG. 3(h) is a diagram showing a window pulse;

FIG. 3(i) is a diagram showing a window pulse;

FIG. 3(j) is a diagram showing the output of a comparator;

FIG. 3(k) is a diagram showing the output of a comparator;

FIG. 3(l) is a diagram showing the output of a flip-flop;

FIG. 4 is a block circuit diagram illustrative of the construction of another recording apparatus of the invention;

DESCRIPTION OF THE PREFERRED EMBODIMENTS

The invention will now be described in detail below with reference to the attached drawings illustrative of the preferred embodiments.

Embodiment 1

Figure 1:
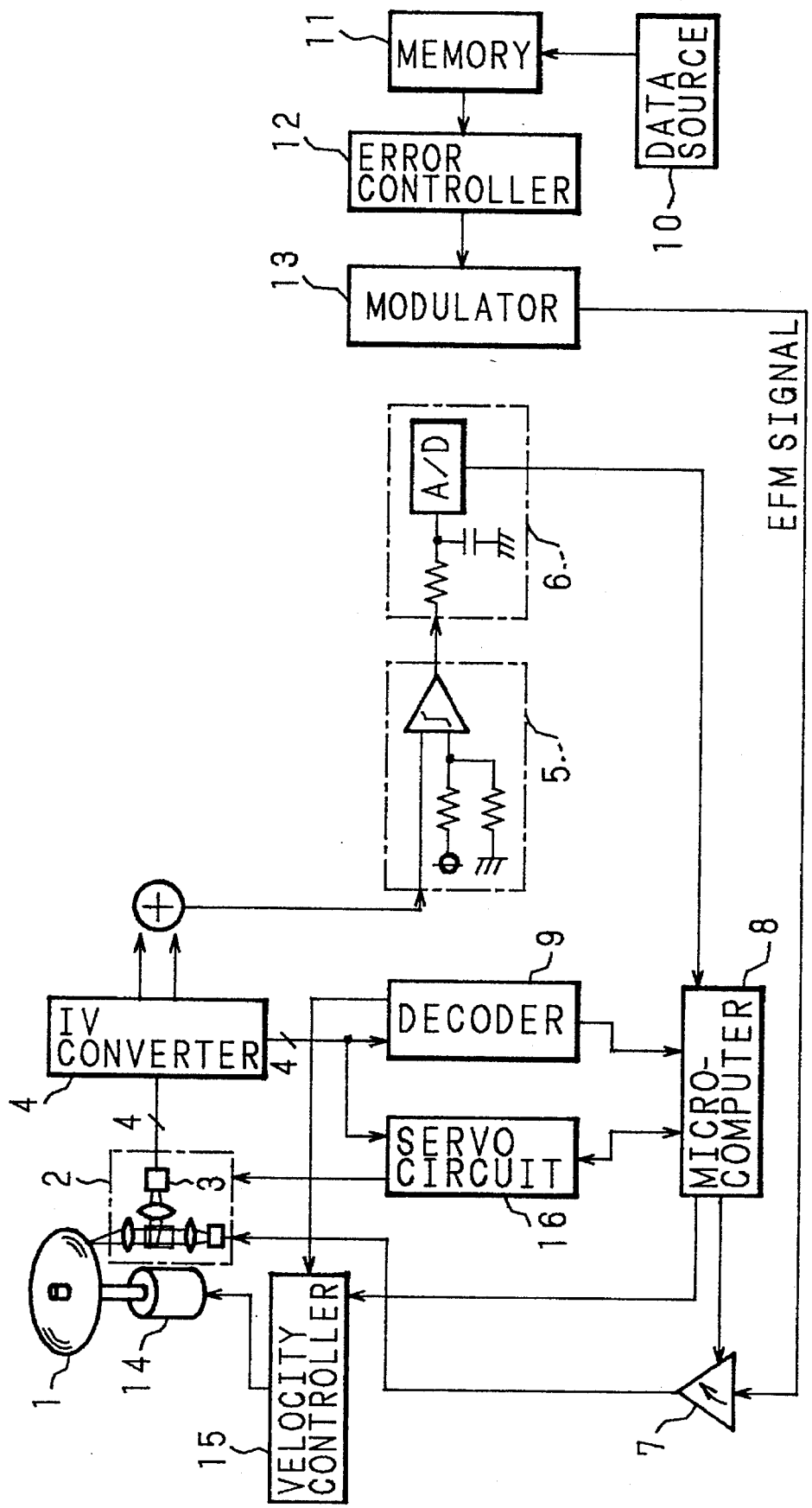
FIG. 1 is a block circuit diagram illustrative of the construction of a recording apparatus of the prior art.
Figure 2:
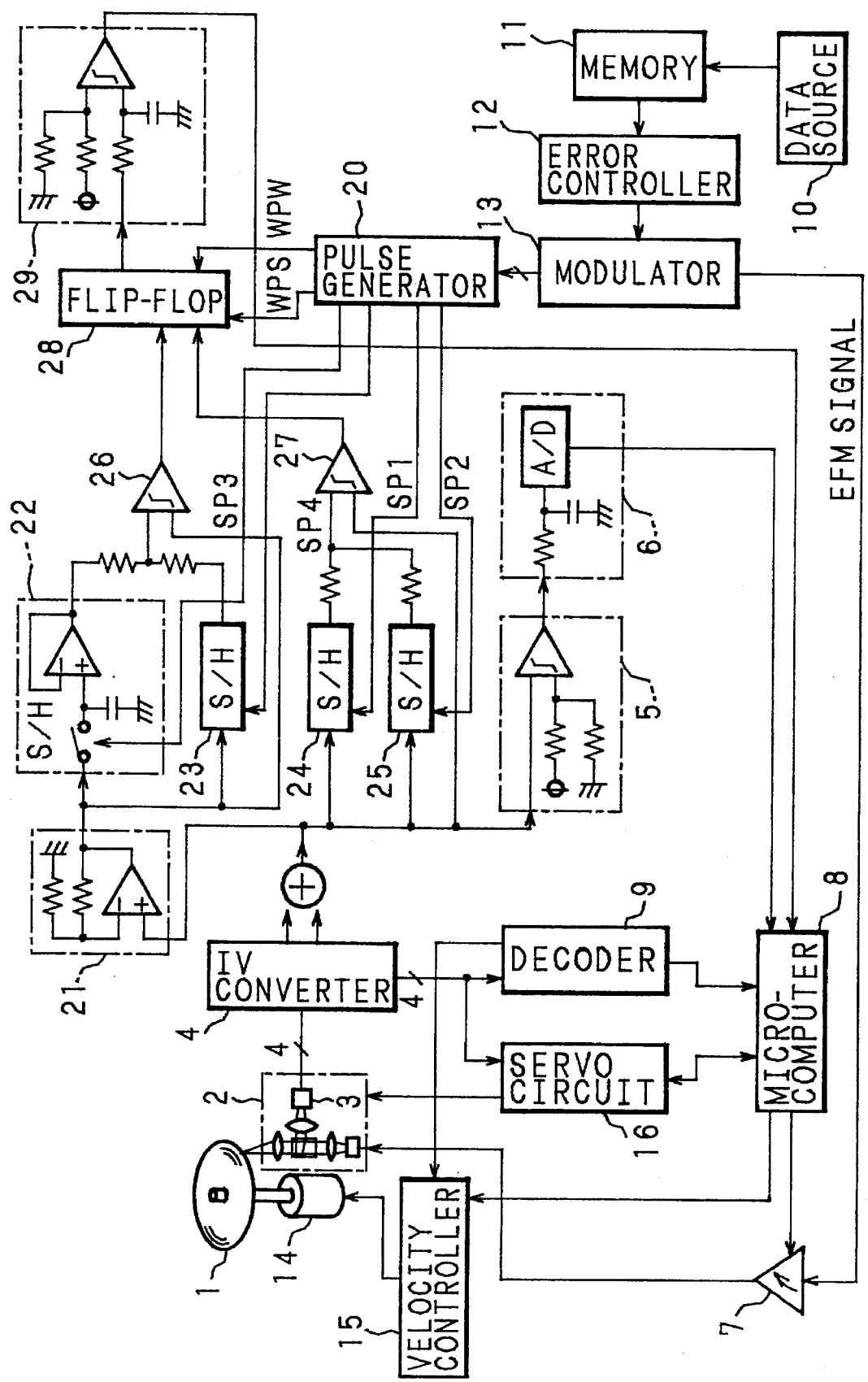
FIG. 2 is a block circuit diagram illustrative of the construction of a recording apparatus of the invention.

FIG. 2 is a block circuit diagram of embodiment 1 of the invention. In FIG. 2, the same numerals as those in FIG. 1 which shows the recording apparatus explained in the description of the prior art denote the same components and the description thereof will be omitted.

In FIG. 2, numeral 20 denotes a pulse generator which, based on the EFM signals from the modulator 13, supplies sampling pulses SP1, SP2, SP3, SP4 and window pulses WPS and WPW corresponding to the strong light beam and the weak light beam, respectively, in the timing shown in FIG. 3(d) through (i). Numeral 21 denotes an amplifier which amplifies the signal to an appropriate amplitude when the intensity of light beam from the pickup 2 is weak. Numerals 22, 23, 24, 25 denote sample and hold circuits (called S/H hereafter) which sample the signals from then I/V converter 4 and the amplifier 21 in synchronization with SP1, SP2, SP3, SP4 and holds the voltage when the pulse has diminished. Numerals 26, 27 denote comparators, the comparator 26 comparing the average voltage of the S/H 22, 23 and the voltage of the amplifier 21 to give the result of comparison shown in FIG. 3 (k) as the output, and the comparator 27 comparing the average voltage of the S/H 24, 25 and the voltage of the I/V converter 4 to give the result of comparison shown in FIG. 3 (j) as the output. Numeral 28 denotes a flip-flop which gives the pit signal as shown in FIG. 3(l) inverted according to the result of comparison by the comparators 26, 27 in the period wherein WPS and WPW exist. Numeral 29 denotes a detector to detect the smoothed value (duty) of the pit signals.

The operation of the apparatus will now be described below. The operation just before the start of recording is identical with the operation in the prior art described previously. FIG. 3(a) through (c) shows the waveform. In FIG. 3, period A is a period during which no pit is formed for a while after the light beam applied from the pickup 2 to the disk 1 has become intense, period B is a period wherein a pit is formed on the disk 1 by a strong light beam and the reflection intensity is at a low level, period C is a period wherein the pit formation is continued for a while after the light intensity has decreased, and period D is a period wherein a pit is not formed due to the decrease of light intensity and the intensity of light reflected off the disk 1 increases. Transition point E between the periods A and B and the transition point F between the period C and D are nothing other than the reproduced signals subjected to binary discrimination when the data recorded on the disk 1 is reproduced, and it is an important criterion of the signal quality of CD that the duty should be 50%.

When recording is started with the recording light intensity which has been set, S/H 22, 23, 24, 25 hold the sampling of voltages which correspond to the intensities of reflected light in the periods A, B, C, D in accordance to SP1, SP2, SP3, SP4. The result of comparison of the average voltage of the S/H 22, 23 and the voltage of the I/V converter 4 by the comparator 26 indicates the transition point E. The result of comparison of the average voltage of the S/H 24, 25 and the voltage of the amplifier 21 by the comparator 27 indicates the transition point F. The results of comparison given by the comparator 26, 27 become noise in the vicinity of the transition point of light from the pickup 2. Therefore the flip-flop 28 changes from "L" to "H" according to the transition signal from the comparator 26 in a period wherein WPS exists, and changes from "H" to "L" according to the transition signal from the comparator 27 in a period wherein WPW exists. As described above, the output signal of the flip-flop 28 corresponds to the reproduced signal when data recorded on the disk 1 is reproduced, and the duty cycle thereof is desirably 50%.

After recording is started, the microprocessor 8 detects the duty cycle of the signal from the flip-flop 28 by means of the signal from the detector 29. When this duty cycle is greater than 50%, because it indicates that the strong light beam from the pickup 2 has an excessive intensity and the pit is formed too long, the microprocessor 8 sets a power slightly lower for the power controller 7. When this duty cycle is below 50%, conversely, because it indicates that the strong light beam from the pickup 2 has an insufficient intensity and the pit is formed too short, the microprocessor 8 sets a power slightly higher for the power controller 7. During recording, the duty cycle of the reproduced signal, when the data recorded on the disk 1 in the procedure described above is reproduced, can always be maintained substantially at 50% by repeating the operations described above.

Embodiment 2

Figure 4:
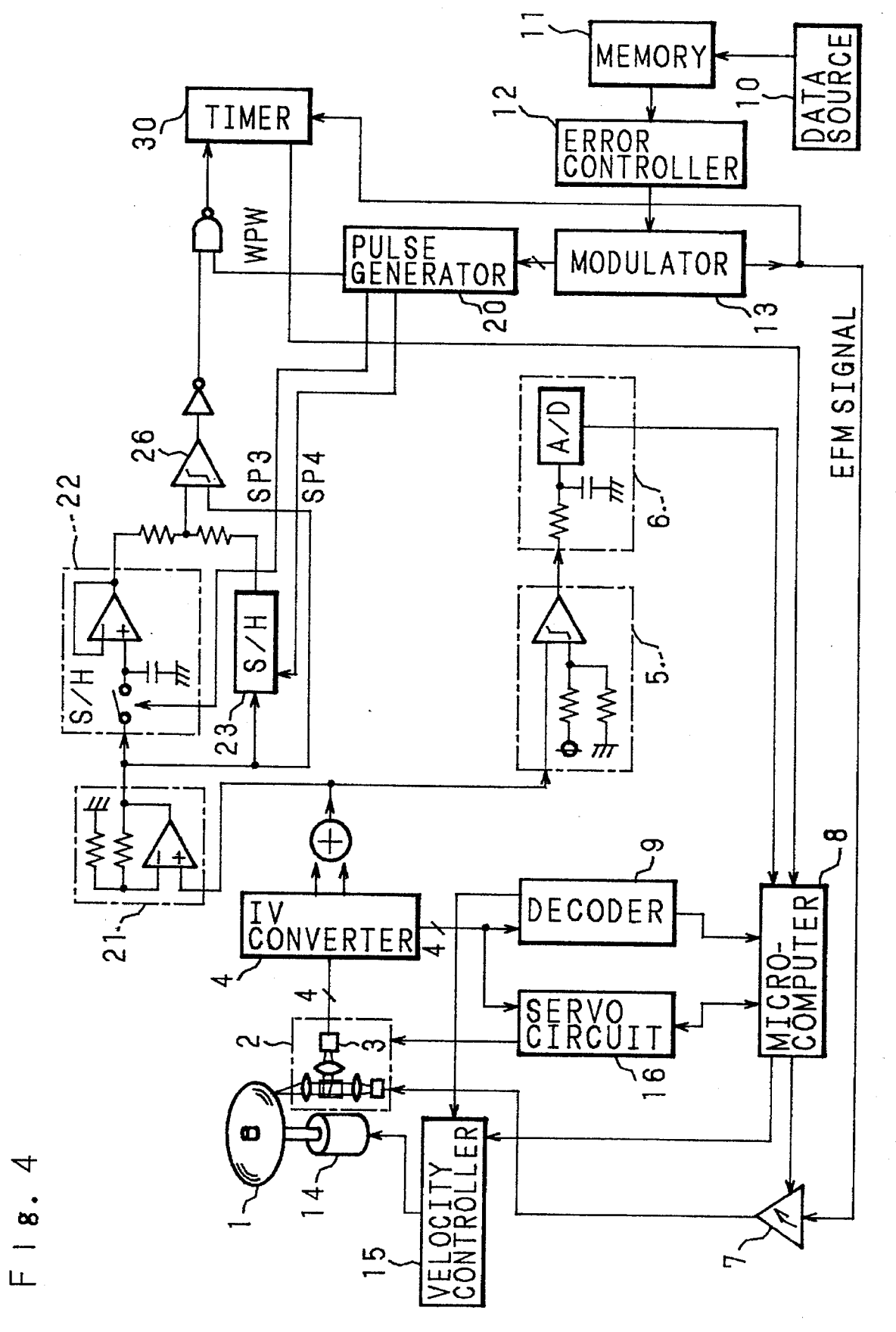

FIG. 4 is a block circuit diagram of embodiment 2 of the invention. In FIG. 4, the same numerals as those of FIG. 2 denote the identical components, and numeral 30 denotes a timer to measure the delay time from the falling point of the record signal from the modulator 13 to the transition point F shown in FIG. 3.

The operation of the apparatus will now be described below. In the first stage wherein the recording light intensity of the prior art described previously is set, the delay time when appropriate light intensity of recording has been successfully set is measured and is stored by the microprocessor 8. After recording is started, the microprocessor 8 compares the delay time measured by the timer 30 and the stored ideal delay time. If the measured delay time is longer than the stored delay time, because a longer pit is formed on the disk 1 due to an excessive light intensity, the microprocessor 8 corrects the pit to the proper length and thereby sets a power slightly lower for the power controller 7. If the measured delay time is shorter than the stored delay time, because a shorter pit is formed on the disk 1 due to too small a light intensity, the microprocessor 8 corrects the pit to a proper length and thereby sets the power slightly higher for the power controller 7. During recording, the duty cycle of the reproduced signal when the data recorded on the disk 1 in the procedure described above is reproduced, can always be maintained substantially at 50% by repeating the operations described above.

Embodiment 3

A similar effect can be obtained also if the power is set by measuring the delay time from the rising point of the record signal to the transition point E in embodiment 2.

Embodiment 4

A similar effect can be obtained also if the power is set by measuring the delay time from WPW or WPS to the transition point F or E in embodiment 2 or 3.

Embodiment 5

Although embodiments 1 through 4 are described by taking the CD-R disk as the example, the invention is also operative in a magneto-optical recording process which causes a magnetic change in the recording medium. Namely, magnetic change in the recording medium can be utilized as a counterpart of the reflected light intensity in the above embodiments, and magnetic change during reproduction of the recording medium can be maintained as a favorable change.

Embodiment 6

Figure 5:
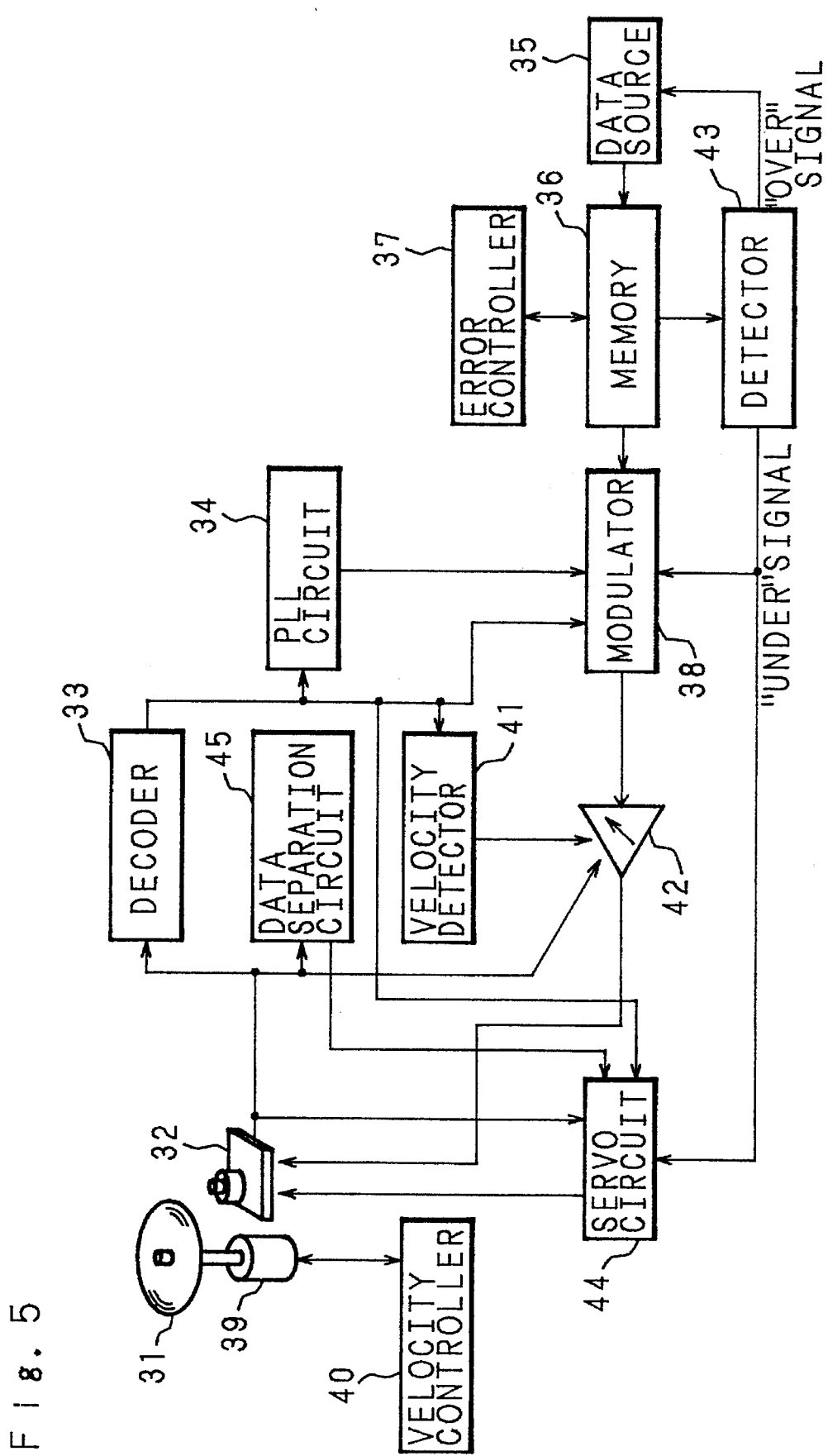
FIG. 5 is a block circuit diagram illustrative of the construction of still another recording apparatus of the invention.

FIG. 5 is a block circuit diagram illustrative of embodiment 6 of the invention. In FIG. 5, numeral 31 denotes a disk serving as a recording medium whereon guide grooves which serve as the targets for applying the converged light beam wobble at nearly constant intervals. The time data, which include constantly updated minute, second and frame numbers (frame numbers are integers 0 through 74 which divide one second into 75 equal parts), and the standard level (OPC) data of the recording light intensity are recorded beforehand. Frames having a frame No. of the time data of 0, 25 or 50 are set as invalid intervals, with the data recorded in these intervals as pits being regarded as invalid.

Numeral 32 denotes a pickup which records and reproduces the data by applying a converged light beam onto the disk 31. Numeral 33 denotes a decoder which separates the time data from noise signal due to the wobbling of the guide grooves. Numeral 34 denotes a PLL circuit which supplies the bit clock of a recording signal to be recorded onto the disk 31 in phase-synchronization with the updating of the separated time data. Numeral 35 denotes a data source which supplies digital data to be recorded. Numeral 36 denotes a memory which temporarily stores the digital data supplied from the data source 35. Numeral 37 denotes an error controller which produces data to be recorded by adding an error control code to the data stored in the memory 36.

Numeral 38 denotes a modulator which reads out the data stored in the memory 36 and converts it into a form of signal suitable for recording and reproduction, thereby to supply the record signal synchronized with the bit clock sent from the PLL circuit 34 to the pickup 32. When the modulator 38 refers to the time data and determines an invalid interval whose frame No. is 0, 25 or 50 from frame No. 74, 24 or 49, the modulator 38 stops operations of reading out the stored data from the memory 36, converting the data into a form of signal suitable for recording and reproduction, and supplying the record signal synchronized with the bit clock to the pickup 32.

Numeral 39 denotes a motor which drives the disk 31 to rotate. Numeral 40 denotes a velocity controller which controls the revolutionary speed of the motor 39 so that the disk 31 rotates at an approximately constant rotation speed number. Numeral 41 denotes a velocity detector which detects the rate of relative movement from of the pickup 32 detecting the time data. Numeral 42 denotes a variable amplifier which adjusts the intensity of the converged light used in recording in accordance to the relative linear velocity detected by the velocity detector 41. Numeral 43 denotes a detector. The detector 43 provides output of an "over" signal which interrupts the data output from the data source 35 when the amount of data stored in the memory 36 exceeds the upper limit, an "under" signal to the modulator 38 and a servo circuit 44 to interrupt the recording onto the disk 31 when the amount of data stored in the memory 36 decreases below the lower limit.

The servo circuit 44 controls the pickup 32 so that the converged light tracks the guide groove of the disk 31 and, upon receipt of the "under" signal, fixes the position wherein the converged light is to be applied to the position where recording was interrupted, based on the time data in synchronization with the interrupt of recording. Numeral 45 denotes a data separation circuit which separates the data recorded onto the disk 31 from the reproduced signal provided by the pickup 32.

The operation of the apparatus will now be described below.

As the first stage of recording, the recording light intensity is determined in the following steps.

(1) The pickup 32 is moved into the inner recordable area of the disk 31 to read the disk 31 and to separate the OPC data by means of the decoder 33.

(2) The OPC data which has been separated is used by the variable amplifier 42 as the first record signal intensity to set a recording light intensity.

(3) The first record signal intensity is used to record on the disk 31 for a short period of time.

(4) The signal recorded for a short period of time in the above step is reproduced, to check if the recording signal intensity is appropriate or not by means of the non-symmetry of the reproduced signal.

(5) In case the recording light intensity is appropriate, the operation proceeds to the second stage and, when it is required to alter the recording light intensity, the variable amplifier 42 changes the recording light intensity and the signal is recorded again for a short period of time and then reproduced.

When the standard recording light intensity is determined in the first stage, actual recording operation is carried out in the second stage as described below.

The servo circuit 44 refers to the reproduced data supplied from the data separation circuit 45 to move the pickup 32 to the end position of data recorded on the disk 31 which becomes the start position of recording. By this movement the rate of relative movement of the disk 31 and the pickup 32 becomes different from the that at the position where the standard recording light intensity was set in the first stage.

The time data which has been recorded beforehand on the disk 31 is separated by the decoder 33 after being detected by pick up 32 and the relative velocity of the pickup 32 at each position on the disk 31 is detected by the velocity detector 41. The variable amplifier 42 sets the intensity of light, which is applied by the pickup 32 onto the disk 31 during recording, based on the standard recording light intensity in accordance with the change in the rate of relative movement.

Data from the data source 35 is written into the memory 36, and data to be recorded is stored in the memory 36 in such a form that an error control code is added to the data by the error controller 37. When the occupation ratio of data in the memory 36 exceeds the lower limit, recording of data onto the disk 31 is started.

The PLL circuit 34 supplies a bit clock signal to the modulator 38 which modulator determines the data recording rate, based on the time data separated by the decoder 33. In the modulator 38, data to be recorded is read out from the memory 36 in synchronization with the bit clock, with the signal format of the data to be recorded being converted, and the record signal is supplied to the pickup 32. Further in the modulator 38, time data from the decoder 33 is referred to in order to determine an invalid interval whose frame No. is 0, 25 or 50 from frame No. 74, 24 or 49 read out from the disk 31, and operations including reading of the stored data from the memory 36, conversion of it to a signal format suitable for recording and reproduction and delivery of the record signal to the pickup 32 is interrupted, thus interrupting the recording operation periodically.

Recording of data onto the disk 31 is started as described above. What should be noted here is the fact that there is no relationship whatsoever between the speed of recording data onto the disk 31 and the speed of the data source 35 to send data. This means that continuing the recording operation under this condition leads to overflow of data in the memory 36 or loss of data due to the mismatch between the speed of writing data onto the memory 36 and the speed of the modulator 38 to read information as the data to be recorded from the memory 36. This embodiment includes measures to prevent this failure which will be described below.

When the speed of recording data from the data source 35 to the memory 36 is higher than the speed of the modulator 38 to read data as the data to be recorded from the memory 36, the amount of data stored in the memory 36 increases according to the difference in speed. When it is determined by the detector 43 that the amount of data stored in the memory 36 has exceeded the upper limit, the detector 43 sends the "over" signal to the data source 35 which stops sending data when it receives the "over" signal. Then the amount of data stored in the memory 36 decreases in accordance to the speed of the modulator 38 in reading the data as the data to be recorded from the memory 36, because data is not being written into the memory 36. When the amount of data stored in the memory 36 decreases below the upper limit, the detector 43 stops sending the "over" signal and the data source 35 resumes transmission of the data. By repeating the above operation, overflow of data in the memory 36 is prevented and data is recorded on the disk 31 normally in such a form that invalid intervals are interposed every specified length.

When the speed of writing data from the data source 35 to the memory 36 is lower than the speed of the modulator 38 to read data as the data to Be recorded from the memory 36, the amount of data stored in the memory 36 decreases according to the difference in speed. When it is determined by the detector 43 that the amount of data stored in the memory 36 has decreased below the lower limit, the detector 43 sends the "under" signal to the modulator 38 and the servo circuit 44. The modulator 38, when it receives the under signal, predicts the position of invalid interval on the disk 31 from the time data separated by the decoder 33, stops reading of the stored data from the memory 36 and sending of the record signal in synchronization with the predicted position of an invalid interval, thereby interrupting the recording onto the disk 31. Then the amount of data stored in the memory 36 increases in accordance with the speed of writing data into the memory 36 from the data source 35 because the reading operation of data from the memory 36 is not being preformed.

The variable amplifier 42, on the other hand, selectively controls selectively the intensity of the converged light from the pickup 32 in synchronization with the interrupt of the recording operation to an intensity that does not cause a physical effect such as pit formation on the disk 31. At the same time, the servo circuit 44 interrupts the control operation for causing the converged light from the pickup 32 to track the guide grooves recorded beforehand on the disk 31, and carries out a control operation for fixing the radial position of the converged light on the disk 31 to the position whereon the recording was interrupted. When the amount of data stored in the memory 36 increases beyond the lower limit, the detector 43 stops sending the "under" signal. Then the servo circuit 44, according to the signal from the data separation circuit 45, moves the position of applying light from the fixed position of the disk 31 to the inner track adjacent thereto and controls it to resume tracking of the guide groove in order to apply the converged light from the pickup 32 onto the portion of the disk 31, whereon data has already been recorded.

Next, after waiting for the recording interrupting position to come by using the time data received from the decoder 33, the modulator 38 resumes reading of the data to be recorded from the memory 36. By repeating the above operations, overflow of data in the memory 36 is prevented and data is recorded normally on the disk 31 in such a form that invalid intervals are interposed every specified length.

Embodiment 7

Figure 6:
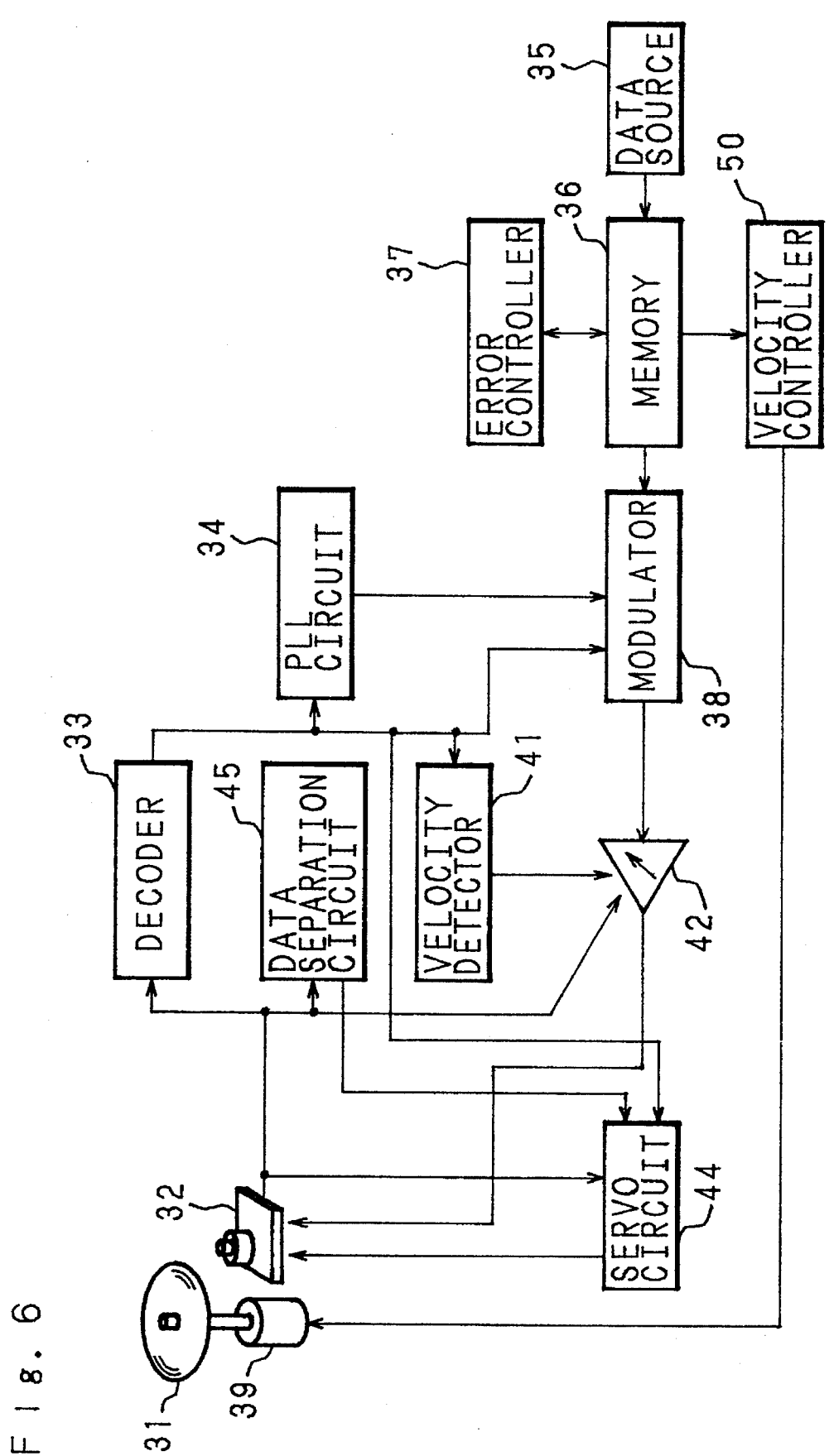
FIG. 6 is a block circuit diagram illustrative of the construction of still another recording apparatus of the invention.

FIG. 6 shows a block circuit diagram illustrative of embodiment 7 of the invention. In FIG. 6, the same numerals as those in FIG. 5 denote the identical components. Numeral 50 denotes a velocity controller which senses the occupation ratio in the memory 36 and sends an occupation ratio signal indicating whether the occupation ratio is higher or lower than a specified level (for example ½), while at the same time controlling the rotation speed of the disk 31 in order to regulate the speed of reading from the memory 36 so that the occupation ratio becomes the specified level.

The operation of the apparatus will now be described below.

As the first stage of recording, the recording light intensity is determined in the following steps.

(1) The velocity controller 50 controls the motor 39 so that the disk 31 rotates at a specified rotation speed (600 rpm), and the servo circuit 44 moves the pickup 32 into the inner recordable area of the disk 31 to read the disk 31 and separate the OPC data by means of the decoder 33.

(2) The OPC data which has been separated is used by the variable amplifier 42 as the first record signal intensity to set a recording light intensity with reference to the speed detected by the velocity detector 41.

(3) The first recording light intensity is used to record on the disk 31 for a short period of time.

(4) The signal recorded for a short period of time in the above step is reproduced, to check to see if the recording light intensity of the signal is appropriate or not by means of the non-symmetry of the reproduced signal.

(5) In case the recording light intensity is appropriate, the operation proceeds to the second stage and, when it is required to alter the recording light intensity, the variable amplifier 42 changes the recording light intensity and the signal is recorded again for a short period of time and then reproduced.

When the standard recording light intensity is determined in the first stage, an actual recording operation is carried out in the second stage as described below.

In the state where the rotation speed of the disk 31 is the same as that in the above first stage, the servo circuit 44 refers to the reproduced data sent from the data separation circuit 45 to move the pickup 32 to the end position of data recorded on the disk 31 which becomes the start position of recording. By this movement the relative speed of the disk 31 and the pickup 32 becomes different from the relative speed at the position where the standard recording light intensity was set in the first stage.

The time data which has been recorded beforehand on the disk 31 is separated by the decoder 33 and the relative speed of the pickup 32 at each position on the disk 31 is detected by the velocity detector 41. The variable amplifier 42 sets the intensity of light, which is applied by the pickup 32 onto the disk 31 during recording, based on the standard recording light intensity in accordance to the change in the relative speed.

Data from the data source 35 is written in the memory 36, and data to be recorded is stored in the memory 36 in such a form that the error control code is added to the data by the error controller 37. When the occupation ratio of data in the memory 36 exceeds the specified level, recording of data onto the disk 31 is started according to the occupation ratio signal from the velocity controller 50.

Since the occupation ratio in the memory 36 is just the specified level, the rotation speed of the disk 31 is kept at that speed set in the first stage. The rotation speed of the disk 31 is controlled by the velocity controller 50, as described below, corresponding to the occupation ratio in the memory 36 with the continuance of recording.

The PLL circuit 34 sends the bit clock signal which sets the data recording rate to the modulator 38 based on the time data separated by the decoder 33. In the modulator 38, the data to be recorded is read from the memory 36 in synchronization with the bit clock signal with the signal format being converted and the record signal is sent to the pickup 32. Further in the modulator 38, time data from the decoder 33 is referred to in order to determine an invalid interval whose frame No. is either 0, 25 or 50 from frame No. 74, 24 or 49, and operations including reading of the data to be recorded from the memory 36, conversion of it to a signal format suitable for recording and reproduction and delivery of the record signal to the pickup 32 is interrupted, thus interrupting the recording operation periodically.

Recording of data onto the disk 31 is started, as described above. What should be noted here is the fact that there is no relationship whatsoever between the rate of recording data on to the disk 31 and the rate of the data source 35 to send data at the instant the recording operation is started. This means that continuing the recording operation under this condition leads to overflow of data in the memory 36 or loss of data due to the mismatch between the rate of writing data onto the memory 36 and the rate of the modulator 38 to read data as the data to be recorded from the memory 36. This embodiment includes measures to prevent this failure which will be described below.

When recording is started while the rate of writing data from the data source 35 to the memory 36 is higher than the rate of the modulator 38 to read data as the data to be recorded from the memory 36, data is stored excessively in the memory 36 according to the difference in rate, with the occupation ratio exceeding the specified level. When the amount of data stored in the memory 36 has increased, the velocity controller 50 increases the rate of reading from the memory 36 and increases the rotation speed of the disk 31 to regulate the occupation ratio at the specified level. This causes the time data updating rate to increase, which in turn results in the increase of bit clock frequency signals from the PLL circuit 34 which are synchronized with the updating rate. Accordingly the rate of the modulator 38 to read, the data to be recorded from the memory 36 also increases and the occupation ratio in the memory 36 lowers its rate of increase. The operation described above proceeds under negative feedback control, wherein the occupation ratio in the memory 36 corresponds to an error signal in the feedback control loop. Therefore the occupation ratio is stabilized to the specified level after a certain period of time.

As described above, overflow and loss of data in the memory 36 is prevented and data is recorded normally on the disk 31 in such a form that invalid intervals are interposed every specified length.

Embodiment 8

Figure 7:
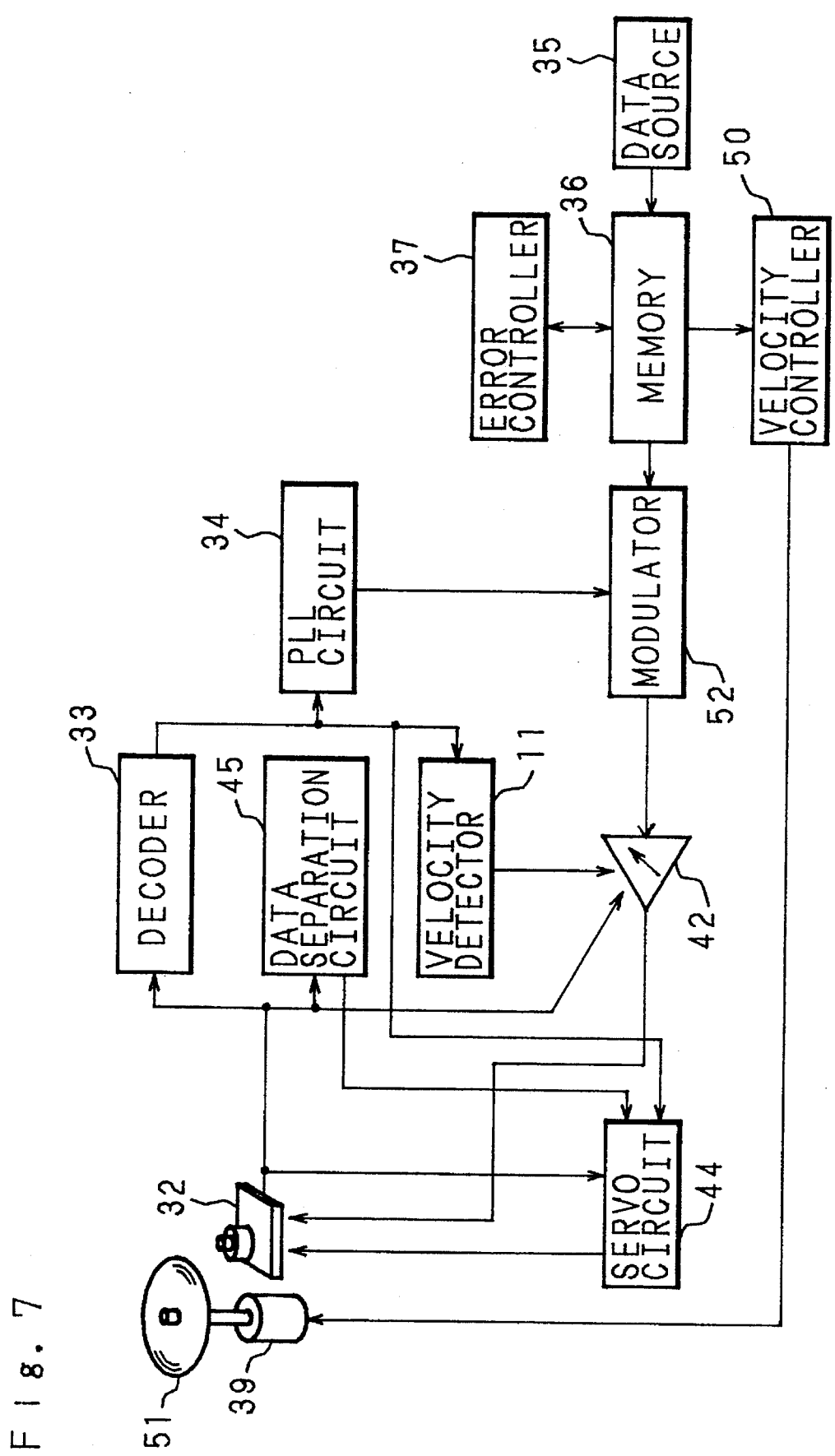
FIG. 7 is a block circuit diagram illustrative of the construction of still another recording apparatus of the invention.

FIG. 7 shows a block circuit diagram illustrative of embodiment 8. In FIG. 7 the same numerals as those in FIG. 5 denote the identical components. Numeral 51 denotes a disk recording medium whereon guide grooves (which serve as the targets for applying the converged light) beam wobble at nearly constant intervals, with time data including the successively updated minute, second and frame numbers (frame numbers are integers 0 through 74 which divide one second into 75 equal parts) and the standard level OPC data of the recording light intensity are recorded beforehand. Numeral 52 denotes a modulator which reads out the data stored in the memory 36 and converts it into a form of signal suitable for recording and reproduction, thereby to supply the record signal synchronized with the bit clock signal from the PLL circuit 34 to the pickup 32.

The operation in this embodiment 8 has a difference from embodiment 7 only in the following points.

While invalid intervals are set on the disk 51 in embodiment 7, invalid intervals are not set in embodiment 8 making this embodiment suitable for recording of data in a continuous form. As for the modulator 52, while embodiment 7 is provided with a function to interrupt recording at the invalid intervals of the disk 31, this function is eliminated in embodiment 8.

Therefore, operation in embodiment 8 is different from embodiment 7 only in that there is no interrupt of recording in embodiment 8, and the occupation ratio in the memory 36 is regulated at a specified level thereby to continue the recording in embodiment 8. As a consequence, data is recorded in a continuous form on the disk 51.

Although embodiments 6 through 8 are described for the purpose of making them easy to understand, taking as example the so-called WORM (Write Once Read memory) optical disk recorder wherein spiral data tracks are formed on the recording medium by applying a converged light beam of strong and weak intensities onto a disk-shaped recording medium to producing a physical change called a pit on the medium where the strong light beams is applied and producing the changes successively along the spiral tracks, the scope of the invention is not limited to these embodiments.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalents thereof are therefore intended to be embraced by the claims.

What is claimed is:

1. A recording apparatus to record data on a recording medium, comprising:

a head for recording data successively on the recording medium by its movement relative to the recording medium;

driving means for imparting relative movement between the recording medium and said head;

decoding means for decoding recording time data that has been recorded on said recording medium; and control means for controlling the data recording rate to be proportional to the recording time data decoded by said decoding means so as to record at a constant linear recording density, said control means including, a memory which stores data for recording on the recording medium, and a velocity controller controlling the relative speed between said recording medium and said head imparted by said driving means based on an amount of information stored in said memory.

2. The apparatus of claim 1, wherein said velocity controller senses said amount of information stored in said memory, compares said amount of information stored in said memory to a threshold value, and controls the relative speed between said recording medium and said head imparted by said driving means based on a result of said comparison.

3. A recording apparatus to record data on a recording medium, comprising:

a head for recording data on the recording medium by selectively applying a recording intensity to the recording medium sufficient to produce magnetic or optical changes in the recording medium during relative movement between the recording medium and the head;

driving means for imparting said relative movement by driving the recording medium or said head;

decoding means for decoding recording time data that has been recorded on said recording medium; and control means for controlling the selective application of said recording intensity so as to be in phase with said recording time data decoded by said decoding means in order to obtain a constant linear recording density, said control means including, a memory which stores data for recording on the recording medium, and a velocity controller controlling the relative speed between said recording medium and said head imparted by said driving means based on an amount of information stored in said memory.

4. A recording apparatus as claimed in claim 3, wherein said detecting means detects the rate of relative movement by monitoring an output read from the recording medium.

5. The apparatus of claim 3, wherein said velocity controller senses said amount of information stored in said memory, compares said amount of information stored in said memory to a threshold value, and controls the relative speed between said recording medium and said head imparted by said driving means based on a result of said comparison.

6. A recording apparatus, for recording data on a recording medium, comprising:

a head for recording data on the recording medium;

a recording medium drive imparting relative movement between the recording medium and said head;

a velocity controller which controls the recording medium drive;

a velocity detector for detecting the rate of relative movement produced by said recording medium drive;

a decoder for decoding recording time data that has been recorded on said recording medium; and means for supplying data received from a data source to said head for recordation on the recording medium at a variable rate, phase-synchronized to the recording time data decoded by said decoder so as to compensate for variations in the rate of relative movement produced by said recording medium drive to thereby record said data on said recording medium at a constant linear recording density, said means for supplying including a memory which stores said data received from said data source, and said means for supplying controlling said velocity controller to control the relative speed between said recording medium and said head based on an amount of information stored in said memory.

7. The recording apparatus of claim 6, wherein said means for supplying said data to said head at a variable rate comprises a phase lock loop which supplies a clock signal to a modulator which determines the data recording rate based on time data separated by a decoder.

8. The recording apparatus of claim 7, wherein said modulator reads out data to be recorded from said memory in synchronization with said clock signal.

9. The apparatus of claim 6, wherein said means for supplying senses said amount of information stored in said memory, compares said amount of information stored in said memory to a threshold value, and controls the relative speed between said recording medium and said head imparted by said driving means based on a result of said comparison.

10. A recording apparatus, for recording data on a recording medium, comprising:

a head for recording data on the recording medium;

a recording medium drive imparting relative movement between the recording medium and said head;

a velocity controller which controls the recording medium drive;

a velocity detector for detecting the rate of relative movement produced by said recording medium drive;

a decoder for decoding recording time data that has been recorded on said recording medium; and means for supplying data to said head for recordation on the recording medium at a variable rate defined by the recording time data decoded by said decoder, said means for supplying including a memory which stores said data, and said means for supplying controlling said velocity controller to control the relative speed between said recording medium and said head based on an amount of information stored in said memory.

11. The recording apparatus of claim 10, wherein said means for supplying reads out data to be recorded from said memory at a rate defined by a clock signal.

12. The recording apparatus of claim 11, wherein said clock signal is synchronized to the recording time data decoded by said decoder.

13. The apparatus of claim 10, wherein said means for supplying senses said amount of information stored in said memory, compares said amount of information stored in said memory to a threshold value, and controls the relative speed between said recording medium and said head imparted by said driving means based on a result of said comparison.

* * * * *